United States Patent
Lin

(10) Patent No.: US 11,503,236 B2
(45) Date of Patent: Nov. 15, 2022

(54) IMAGE-SENSING SYSTEM AND DETECTION AND CORRECTION METHOD FOR DEFECTIVE PIXEL

(71) Applicant: Silicon Optronics, Inc., Hsinchu (TW)

(72) Inventor: Chun-Hung Lin, Hsinchu (TW)

(73) Assignee: SILICON OPTRONICS, INC., Hsinchu (TW)

( * ) Notice: Subject to any disclaimer, the term of this patent is extended or adjusted under 35 U.S.C. 154(b) by 0 days.

(21) Appl. No.: 17/132,351

(22) Filed: Dec. 23, 2020

(65) Prior Publication Data

US 2021/0337143 A1 Oct. 28, 2021

(30) Foreign Application Priority Data

Apr. 24, 2020 (TW) .................................. 109113746

(51) Int. Cl.
*H04N 5/367* (2011.01)
*H04N 5/355* (2011.01)
*H04N 5/345* (2011.01)

(52) U.S. Cl.
CPC ........... *H04N 5/3675* (2013.01); *H04N 5/345* (2013.01); *H04N 5/35536* (2013.01)

(58) Field of Classification Search
None
See application file for complete search history.

(56) References Cited

U.S. PATENT DOCUMENTS

| 2008/0273102 | A1* | 11/2008 | Hyakutake | H04N 5/367 348/E9.037 |
| 2012/0020541 | A1* | 1/2012 | Hayashida | A61B 6/583 382/275 |
| 2012/0105689 | A1* | 5/2012 | Kitani | H04N 5/2173 348/222.1 |
| 2012/0218447 | A1* | 8/2012 | Furuya | H04N 5/3675 348/246 |
| 2013/0155265 | A1* | 6/2013 | Bae | H04N 5/23229 348/241 |
| 2013/0208974 | A1* | 8/2013 | Nakano | G06T 7/001 382/149 |
| 2014/0016005 | A1* | 1/2014 | Kishima | G06T 1/20 348/246 |
| 2014/0063297 | A1* | 3/2014 | Yamura | H04N 9/0451 348/242 |

(Continued)

FOREIGN PATENT DOCUMENTS

TW 201616861 A 5/2016
TW 201720133 A 6/2017

*Primary Examiner* — Twyler L Haskins
*Assistant Examiner* — Dwight Alex C Tejano
(74) *Attorney, Agent, or Firm* — Muncy, Geissler, Olds & Lowe, P.C.

(57) ABSTRACT

An image-sensing system for the efficient detection of defective pixels is shown. An arithmetic logic unit (ALU) determines a defective pixel candidate of an image sensor based on the first frame captured by the image sensor, performs a lower-part comparison on the defective pixel candidate based on the first frame, and performs an upper-part comparison on the defective pixel candidate based on the second frame captured by the image sensor. The defective pixel candidate is confirmed to be defective based on the first frame as well as the second frame. Only limited pixel data is buffered for the defective pixel detection.

19 Claims, 12 Drawing Sheets

(56) References Cited

U.S. PATENT DOCUMENTS

| | | | |
|---|---|---|---|
| 2014/0211048 A1* | 7/2014 | Kolli | H04N 5/3675 |
| | | | 348/246 |
| 2016/0127667 A1* | 5/2016 | Lin | H04N 5/3675 |
| | | | 348/246 |
| 2017/0070692 A1* | 3/2017 | Lin | H04N 5/2176 |
| 2017/0078599 A1* | 3/2017 | Higuchi | H01L 27/14645 |
| 2017/0078600 A1* | 3/2017 | Higuchi | H04N 5/3575 |

* cited by examiner even the following figure shows

IMAGE-SENSING SYSTEM AND DETECTION AND CORRECTION METHOD FOR DEFECTIVE PIXEL

CROSS REFERENCE TO RELATED APPLICATIONS

This Application also claims priority of Taiwan Patent Application No. 109113746, filed on Apr. 24, 2020, the entirety of which is incorporated by reference herein.

BACKGROUND OF THE INVENTION

Field of the Invention

The present invention is related to the detection and correction of defective photosensitive elements of image sensors.

Description of the Related Art

When it leaves the factory, an image sensor (such as a CMOS image sensor) may have some photosensitive elements with defects, and their response to light may be significantly different than that of the surrounding photosensitive elements. Moreover, some photosensitive elements may only output absolute bright white or absolute dark as the sensed result. The above defects may also be caused by the external environment after leaving the factory. For example, some photosensitive elements may become defective due to age. The defective photosensitive elements will affect the overall quality of the image.

The defective photosensitive elements can generally be found by comparing the detected data of a plurality of photosensitive pixels, and are corrected based on the photosensitive result of a plurality of surrounding photosensitive pixels. Conventional technologies usually plan a line buffer to temporarily store pixel data line by line to provide a large amount of photosensitive results of photosensitive pixels required for defective pixel detection and correction. Moreover, some technologies will use multiple line buffers, and the cost can be considerable.

BRIEF SUMMARY OF THE INVENTION

A low-cost defect detection and correction technology for photosensitive elements is proposed, which does not require any large line buffers. A small-sized buffer is enough, and so power consumption is significantly reduced.

An image-sensing system in accordance with an exemplary embodiment of the present invention includes an arithmetic logic unit and a defect buffer coupled to the arithmetic logic unit. The arithmetic logic unit determines a defective pixel candidate of an image sensor based on the first frame captured by the image sensor, performs a lower-part comparison on the defective pixel candidate based on the first frame, and performs an upper-part comparison on the defective pixel candidate based on the second frame captured by the image sensor. The defective pixel candidate is confirmed to be defective based on the first frame as well as the second frame. Corresponding to the defective pixel candidate, the arithmetic logic unit uses the defect buffer to store the first set of pixel data of the first frame to be accessed in the lower-part comparison. The first set of pixel data is captured by a portion of pixels in the line where the defective pixel candidate is located. The arithmetic logic unit also uses the defect buffer to store a second set of pixel data of the second frame to be accessed in the upper-part comparison. The second set of pixel data is captured by a portion of pixels in an upper line of the defective pixel candidate.

In an exemplary embodiment, the arithmetic logic unit uses the defect buffer to store: a defect flag, marking the defective pixel candidate as a bright spot or a dark spot; a defect position, recording the position of the defective pixel candidate; and the first set of pixel data, or the second set of pixel data that overwrites the first set of pixel data.

In an exemplary embodiment, when processing the first frame, the arithmetic logic unit checks a plurality of surrounding pixels which are in the same line as a target pixel and, accordingly, determines whether the target pixel is the defective pixel candidate. When the target pixel is determined to be the defective pixel candidate, the arithmetic logic unit uses the defect buffer to store pixel data of the target pixel and pixel data of the plurality of surrounding pixels as the first set of pixel data.

In an exemplary embodiment, when processing the first frame, the arithmetic logic unit checks the defect buffer to determine whether a target pixel is right below the defective pixel candidate. When the target pixel is right below the defective pixel candidate, the arithmetic logic unit reads the defect buffer to get the first set of pixel data. Based on the first set of pixel data read from the defect buffer and a third set of pixel data of the first frame, the arithmetic logic unit performs the lower-part comparison on the defective pixel candidate. The third set of pixel data is captured by a portion of pixels in a line where the target pixel is located.

In an exemplary embodiment, the defect buffer also records the position of the defective pixel candidate. When processing the second frame, the arithmetic logic unit checks the defect buffer to determine whether a target pixel is right above the defective pixel candidate. When the target pixel is right above the defective pixel candidate, the arithmetic logic unit uses the defect buffer to store pixel data of a portion of pixels in a line where the target pixel is located as the second set of pixel data, and overwrites the first set of pixel data stored in the defect buffer by the second set of pixel data.

In an exemplary embodiment, when processing the second frame, the arithmetic logic unit checks the defect buffer to determine whether a target pixel is the defective pixel candidate. When the target pixel is the defective pixel candidate, the arithmetic logic unit reads the defect buffer to get the second set of pixel data. Based on the second set of pixel data read from the defect buffer and a fourth set of pixel data of the second frame, the arithmetic logic unit performs the upper-part comparison on the defective pixel candidate. The fourth set of pixel data is captured by a portion of pixels in a line where the target pixel is located.

In an exemplary embodiment, when the defective pixel candidate is confirmed to be defective by the upper-part comparison, the arithmetic logic unit compensates for the defective pixel candidate according to the defect flag based on the second set of pixel data read from the defect buffer and the fourth set of pixel data.

In an exemplary embodiment, prior to the first frame, the defect buffer has stored information for a defective pixel. The arithmetic logic unit checks the defect buffer to determine whether a processing procedure of the first frame proceeds to an upper pixel of the defective pixel. When the processing procedure of the first frame proceeds to the upper pixel of the defective pixel, the arithmetic logic unit uses the defect buffer to store a fifth set of pixel data. The fifth set of pixel data is captured by a portion of pixels in a line where the upper pixel is located. When the processing procedure of the first frame proceeds to the defective pixel, the arithmetic logic unit reads the defect buffer to get the fifth set of pixel data. Based on the fifth set of pixel data read from the defect buffer and a sixth set of pixel data of the first frame, the arithmetic logic unit compensates for the defective pixel according to a defect flag of the defective pixel. The sixth set of pixel data is captured by a portion of pixels in a line where the defective pixel is located.

In an exemplary embodiment, the image-sensing system further includes: a defective pixel detection and correction circuit, having the arithmetic logic unit and the defect buffer; and an image processor coupled to the defective pixel detection and correction circuit and the image sensor. The image processor sets an exposure interval of the image sensor prior to setting the exposure compensation gain of the image sensor. As set by the image processor, the image sensor uses the same exposure intervals and the same exposure compensation gains to capture the first frame and the second frame.

In an exemplary embodiment, the image-sensing system includes the image sensor. The image sensor is coupled to the defective pixel detection and correction circuit, and coupled to the image processor through the defective pixel detection and correction circuit.

In another exemplary embodiment, a method for defective pixel detection and correction is shown based on the forgoing concept of image-sensing system.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

Figure 1:
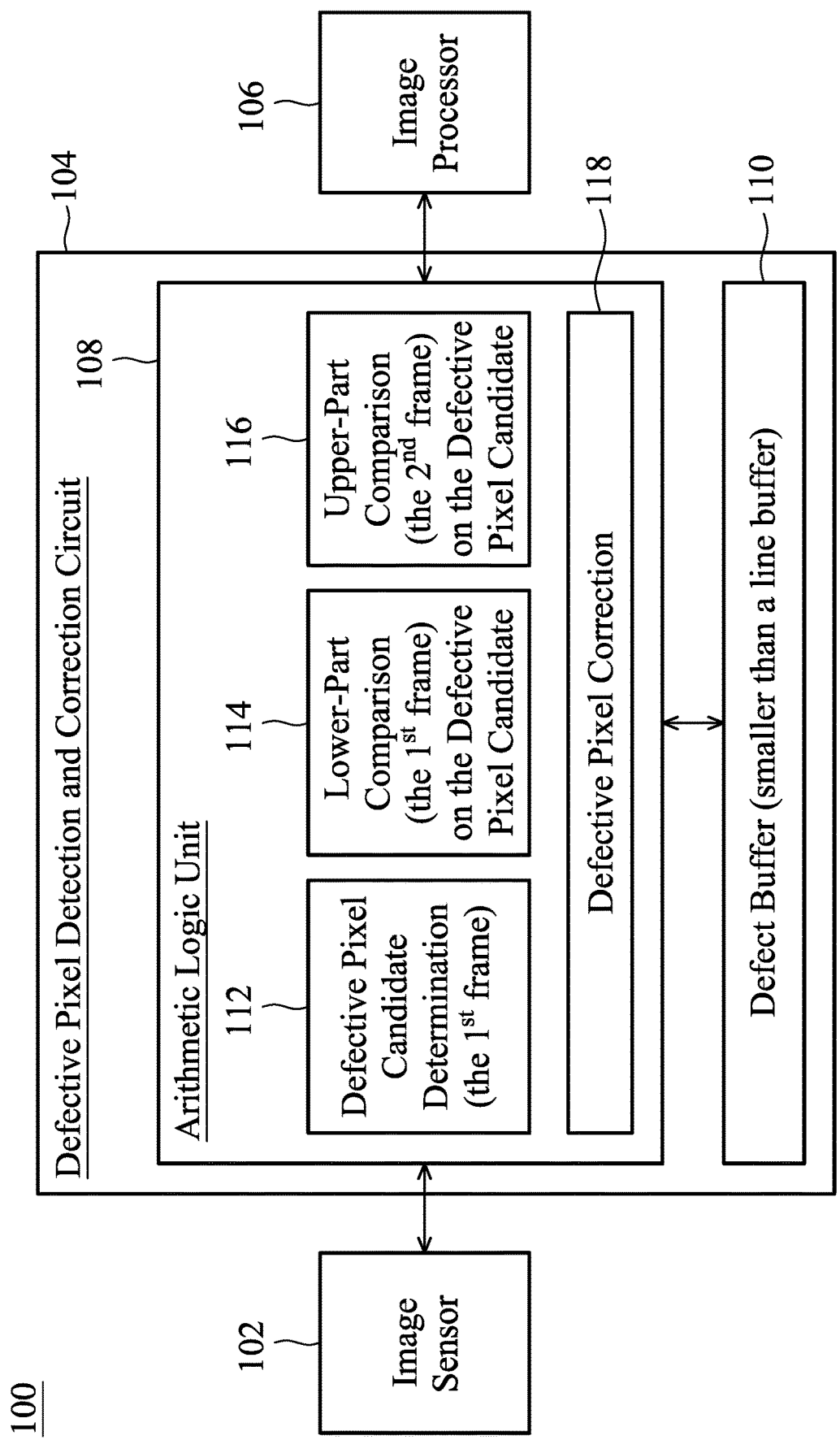
FIG. 1 is an image-sensing system 100 in accordance with an exemplary embodiment of the present invention.

FIG. 1 is an image-sensing system 100 in accordance with an exemplary embodiment of the present invention, which may be a picture camera or a video camera. The image-sensing system 100 includes an image sensor 102 (such as a CMOS image sensor), a defective pixel detection and correction circuit 104, and an image processor 106. The defective pixel detection and correction circuit 104 is coupled between the image sensor 102 and the image processor 106, and includes an arithmetic logic unit (ALU) 108 and a defect buffer 110. The arithmetic logic unit 108 may include ALU hardware and a memory storing hardware opcode. The arithmetic logic unit 108 receives image data captured by the image senor 102 and, accordingly, detects and corrects pixel data of defective photosensitive elements (i.e., defective pixels). The arithmetic logic unit 108 outputs the corrected pixel data to the image processor 106. The defect buffer 110 is a temporary storage device for calculations performed by the arithmetic logic unit 108. In the present invention, the defect buffer 110 does not need to store information for normal pixels. In comparison with line buffers storing complete lines of pixel data, the size of the defect buffer 110 is much smaller. The design of the arithmetic logic unit 108 and the defect buffer 110 are detailed below.

The arithmetic logic unit 108 includes functional blocks 112, 114, and 116 which detect defective photosensitive elements (i.e., defective pixels) based on two subsequent frames, and includes a functional block 118 that corrects the defective pixels. According to the first frame, the functional block 112 determines the defective pixel candidates, and the functional block 114 performs a lower-part comparison on the defective pixel candidates (deemed as a preliminary review). According to the second frame, the functional block 116 performs an upper-part comparison on the defective pixel candidates (deemed as final review). Since there is no need to review normal pixels, it is not necessary to buffer the pixel data of normal pixels. The size of the defect buffer 110, therefore, is much smaller than a line buffer used in the traditional technology. The limited information buffered in the defect buffer 110 is enough for the functional block 118 to correct defective pixels. The conventional line buffer, therefore, is not required in the hardware design. The technology of each functional block is discussed in detail below.

Figure 2:
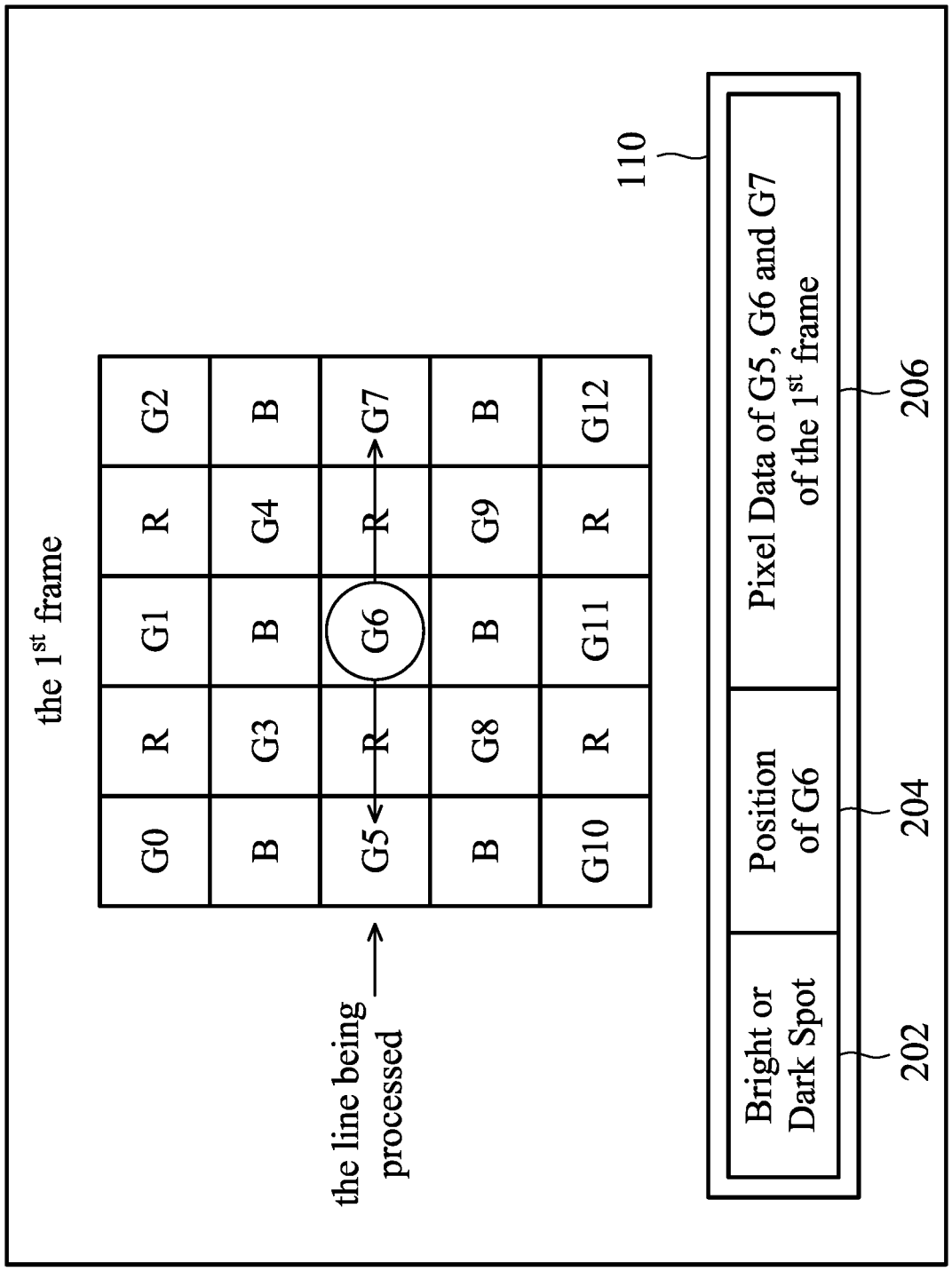
FIG. 2 is related to the functional block 112, wherein the first frame is being processed and the line being processed includes the pixel G6.

FIG. 2 is related to the functional block 112, which is processing the first frame. In FIG. 2, the line being processed is the line containing a pixel G6. The functional block 112 regards the pixel G6 as the target pixel and verifies whether the target pixel G6 is a defective pixel candidate by checking whether there is a significance difference between the target pixel G6 and the surrounding pixels in the line being processed. For example, the differences between the target pixel G6 and the surrounding pixels G5 and G7 may be compared with a threshold value to determine whether the target pixel G6 is a defective pixel candidate. In another exemplary embodiment, the determination of defective pixel candidate is based extrapolation of more surrounding pixels. If the pixel data of the target pixel G6 is far greater than the surrounding pixels in the line being processed, the target pixel G6 a candidate of a bright spot. If the pixel data of the target pixel G6 is far lower than the surrounding pixels in the line being processed, the target pixel G6 is a candidate of a dark spot. Corresponding to the defective pixel candidate, the arithmetic logic unit 108 may use the defect buffer 110 to store: a defect flag 202 (e.g., to mark the defective pixel candidate G6 as a candidate of bright or dark spot), defect position 204 (e.g., the position of the defective pixel candidate G6), and pixel data 206 (e.g., pixel data of pixels G5, G6 and G7 of the first frame).

Figure 3:
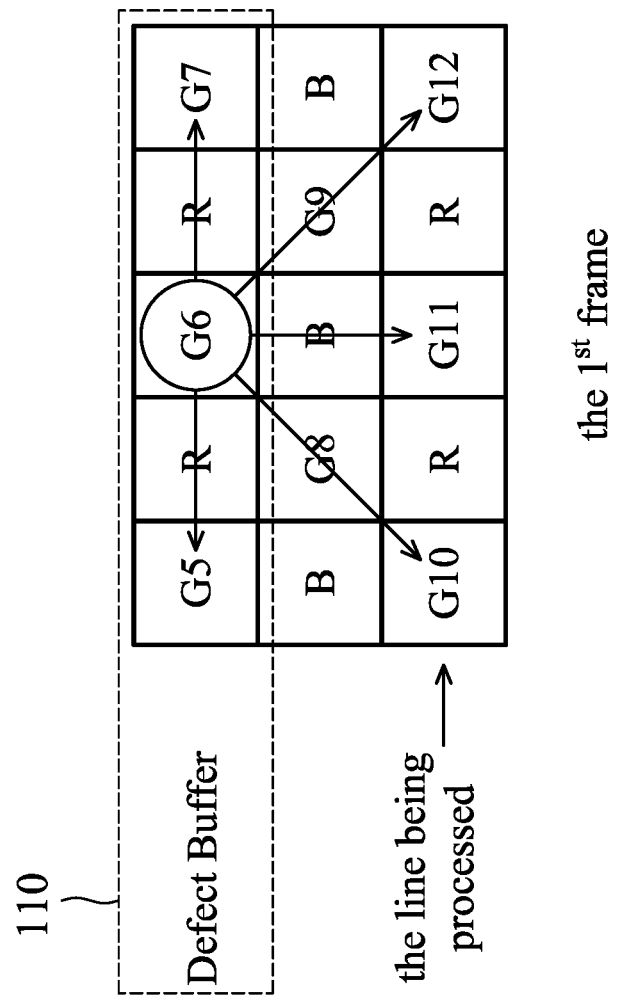
FIG. 3 is related to the functional block 114, wherein the first frame is being processed and the line being processed includes the pixel G11 which is the target pixel at this moment.

FIG. 3 is related to the functional block 114, which is processing the first frame. The target pixel to be processed is the pixel G11, and the line containing the pixel G11 is the line being processed. According to the defect position of the defective pixel candidate G6 recorded in the defect buffer 110, the arithmetic logic unit 108 determines that the target pixel G11 is right below the defective pixel candidate G6, and the pixel data of pixels G10, G11, and G12 in the line being processed is required in the lower-part comparison performed by the functional block 114. If the differences between the defective pixel candidate G6 and the pixels G10, G11, and G12 comply with the differences between the defective pixel candidate G6 and the pixels G5 and G7, showing that defective pixel candidate G6 is a bright or dark spot, the arithmetic logic unit 108 does not change the buffered information (pixel data of pixels G5, G6 and G7 of the first frame) in the defect buffer 110. If the pixel data of pixels G10, G11, and G12 does not comply the bright or dark spot judgment previously made for the pixel G6, the arithmetic logic unit 108 may change the defect buffer 110 to clear the information related to the defective pixel candidate G6.

Figure 4:
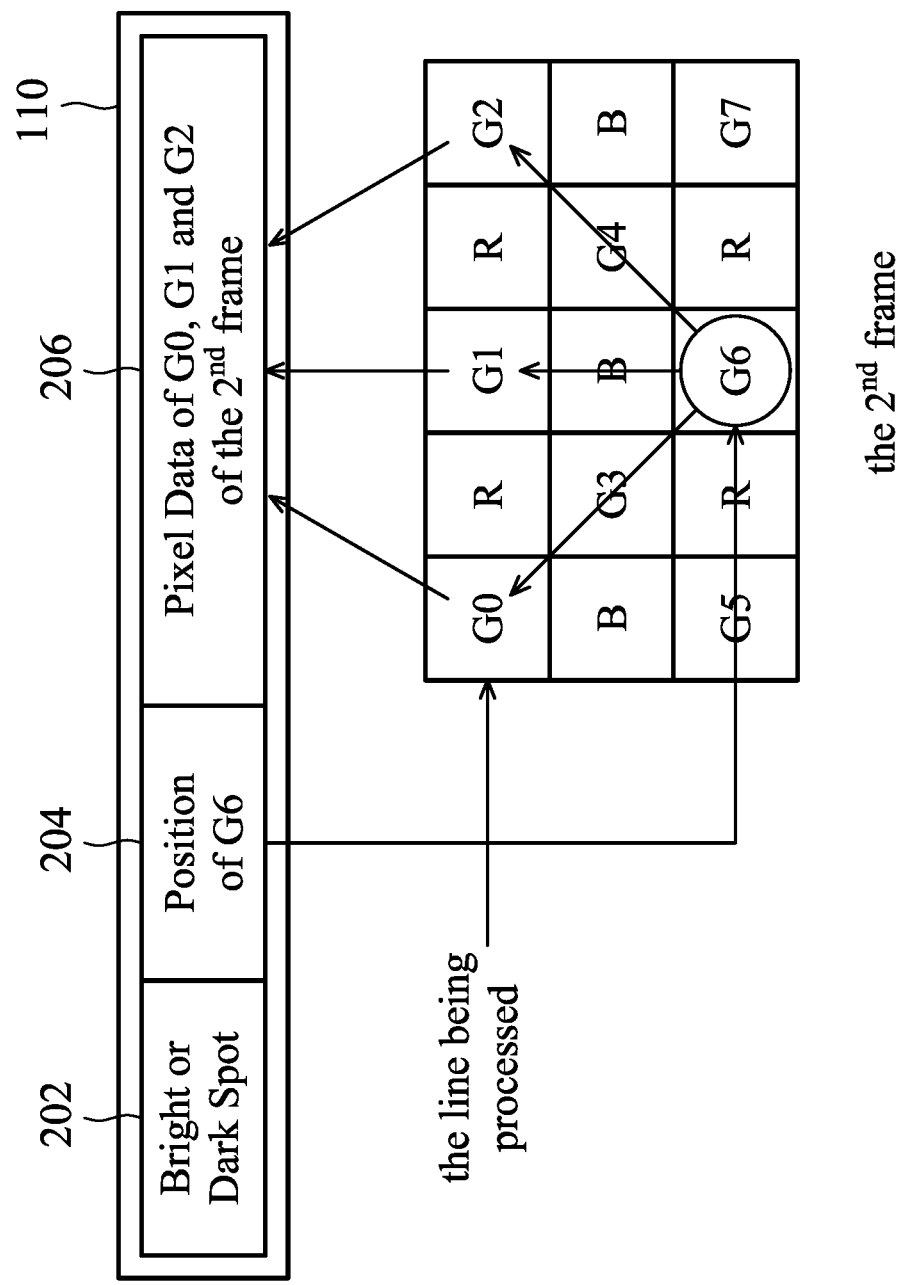
FIG. 4 is related to the pre-work for the functional block 116, wherein the second frame is being processed and the line being processed includes the pixel G1 which is the target pixel at this moment.

FIG. 4 is related to the pre-work for the functional block 116, which is processing the second frame. The target pixel to be processed is the pixel G1, and the line containing the pixel G1 is the line being processed. According to the defect position of the defective pixel candidate G6 recorded in the defect buffer 110, the arithmetic logic unit 108 determines that the target pixel G1 is right above the defective pixel candidate G6, and the pixel data of pixels G0, G1, and G2 in the line being processed is required in the later upper-part comparison performed by the functional block 116. The arithmetic logic unit 108 may program the pixel data of pixels G0, G1, and G2 of the second frame into the defect buffer 110, to overwrite the pixel data of pixels G5, G6, and G7 of the first frame.

Figure 5:
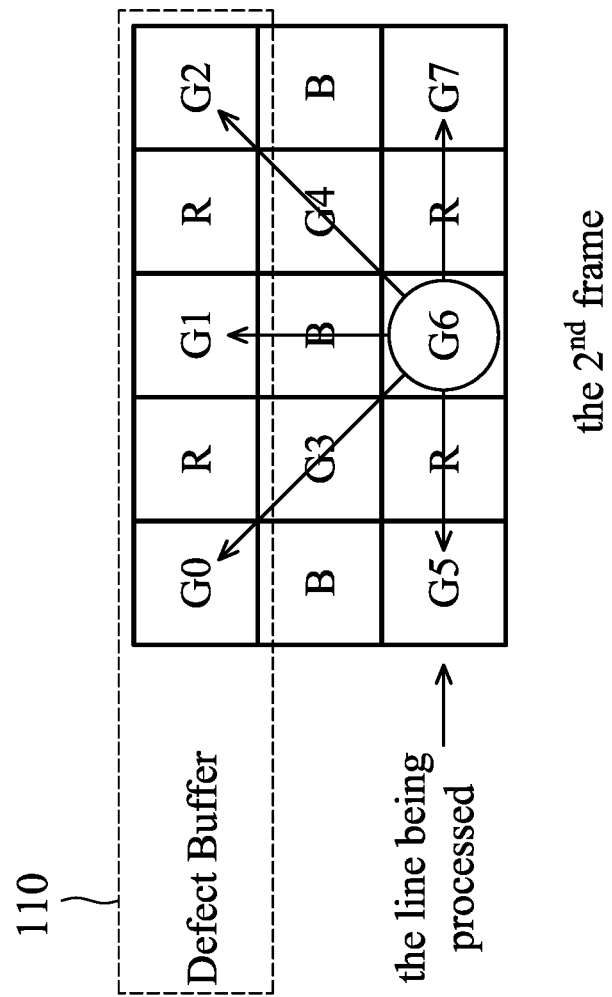
FIG. 5 is related to the comparison function of the functional block 116, wherein the second frame is being processed and the line being processed includes the pixel G6 which is the target pixel at this moment.

FIG. 5 is related to the comparison function of the functional block 116, which is processing the second frame. The target pixel to be processed is the pixel G6, and the line containing the pixel G6 is the line being processed. According to the defect position of the defective pixel candidate G6 recorded in the defect buffer 110, the arithmetic logic unit 108 determines that the pixel data of pixels G0, G1 and G2 (above the defective pixel candidate G6) of the second frame is required to operate the functional block 116 for the upper-part comparison of the defective pixel candidate G6. The arithmetic logic unit 108 reads the defect buffer 110 to get the pixel data of pixels G0, G1, and G2 of the second frame. Based on the pixel data of pixels G0, G1, and G2 of the second frame and the pixel data of pixels G5 and G7 of the line being processed, the upper-part comparison is performed on the defective pixel candidate G6. When the comparison result confirms that the defective pixel candidate G6 is a bright or dark spot, the computing unit 108 does not change the content of the defect buffer 110. If the upper-part comparison performed based on the pixel data of pixels G0, G1, G2, G5, G6, and G7 of the second frame shows that the target pixel G6 is not defective, the previous judgment is overturned, and the arithmetic logic unit 108 may change the defect buffer 110 to clear the information related to the defective pixel candidate G6.

When it is confirmed in second frame that the pixel G6 is a defective pixel, the functional block 118 compensates for the defect of the defective pixel G6. For example, the available pixel data includes the pixel data of pixels G0, G1 and G2 of the second frame buffered in the defect buffer 110 and the pixel data of pixels G5 and G7 of the line being processed. The available pixel data G0, G1, G2, G5, and G7 may be summed up and averaged, and the average may be applied to correct the pixel data of the pixel G6 of the second frame. The corrected pixel data of the pixel G6 of the second frame is transmitted to the image processor 106. In another exemplary embodiment, the functional block 118 may use the brightest pixel data among the pixel data of pixels G0, G1, G2, G5, and G7 of the second frame to correct the pixel data of the pixel G6 when the pixel G6 is a bright spot, and use the darkest pixel data among all the pixel data of pixels G0, G1, G2, G5, and G7 of the second frame to correct the pixel data of the pixel G6 when the pixel G6 is a dark spot.

The defective pixel candidates detected in the first frame are preliminarily reviewed by lower-part comparison based on pixel data of the first frame, and are checked again (final review) by upper-part comparison based on pixel data of the second frame. Pixel correction is performed on the defective pixel data confirmed by the final review.

Figure 6A:
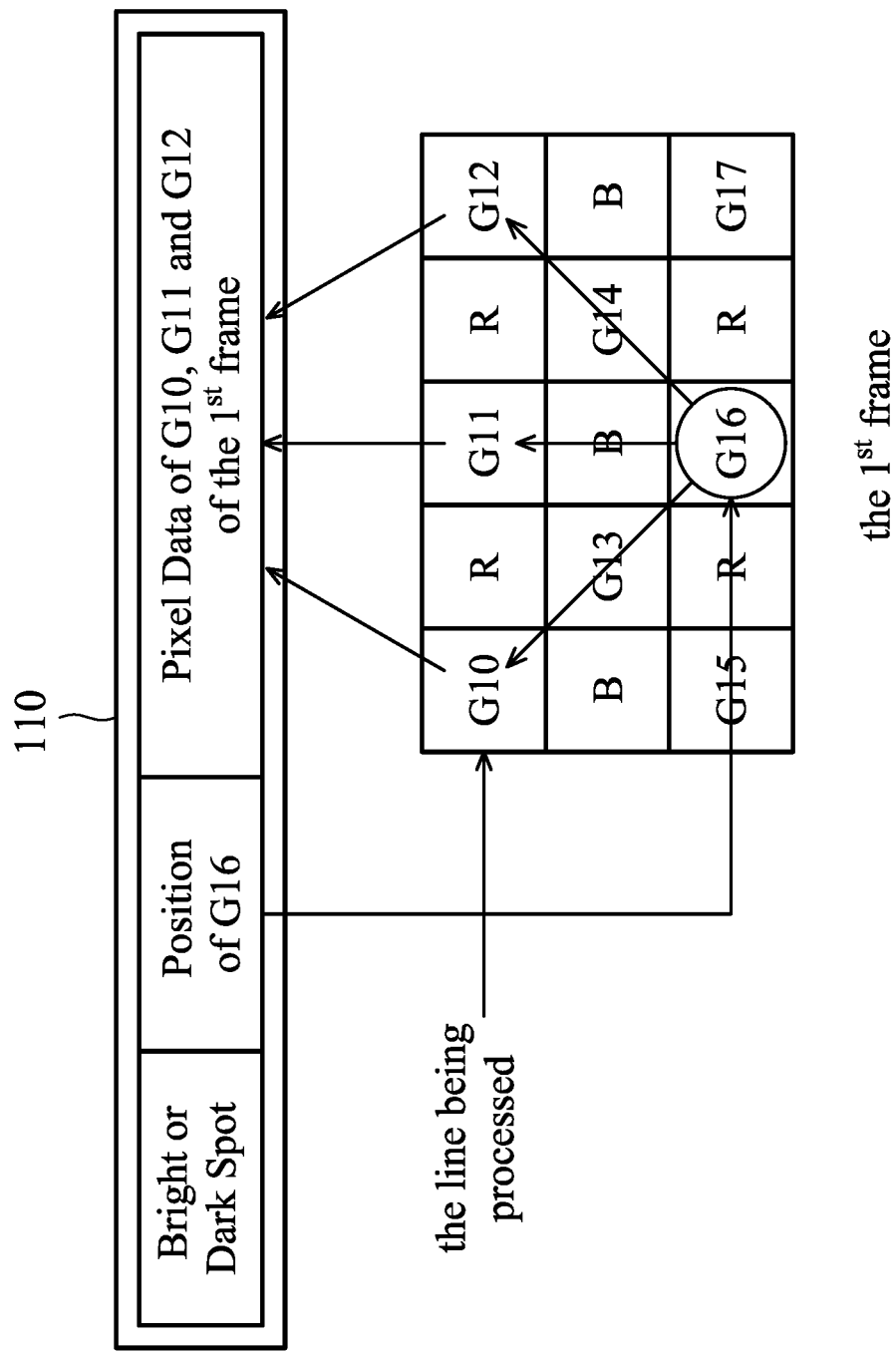
FIGS. 6A and 6B illustrate the correction technology for a defective pixel detected in the earlier time.
Figure 6B:
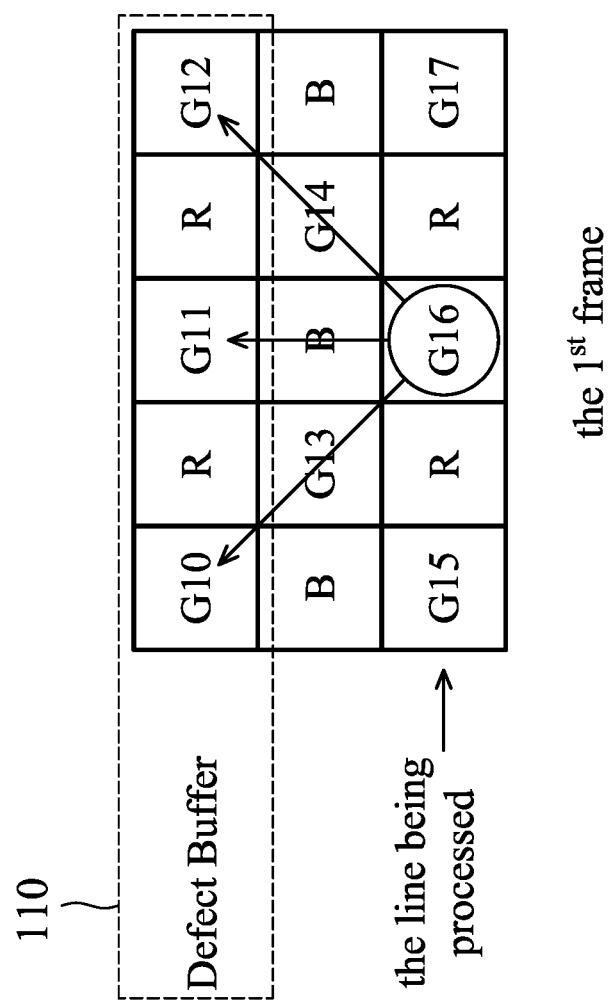

As for the photosensitive pixels that have been confirmed as defective in the earlier detection, FIGS. 6A and 6B illustrate the correction technology. In this example, information regarding the defective pixel G16 has been programmed into the defect buffer 110 prior to the processing of the first frame.

Referring to FIG. 6A, when processing the first frame, the arithmetic logic unit 108 checks the defect buffer 110. When the processing procedure of the first frame proceeds to an upper pixel G11 of the defective pixel G16, pixel data of the pixels G10, G11, and G12 in the same line are programmed into the defect buffer 110 in the column regarding the defective pixel G16.

Referring to FIG. 6B, when the processing procedure of the first frame proceeds to the defective pixel G16 the arithmetic logic unit 108 reads the defect buffer 110 to get the pixel data of pixels G10, G11, and G12. Based on the pixel data G15 and G17 in the line where the defective pixel G16 is located as well as the pixel data G10, G11, and G12 read from the defect buffer 110, the defective pixel G16 is compensated for according to its defect flag (e.g., read from the defect buffer 110 corresponding to the defective pixel G16).

In an exemplary embodiment, the defective pixel detection and correction circuit 104 is capable of correcting M defective pixels, and the storage capacity of the defect buffer 110 may be ((N+1)×P+Q+1)×M bits. N is the number of surrounding pixels that are in the same line as the defective pixel and are referred to in the defective pixel detection and correction. P is the bit length of each pixel data. Q is the bit length of the defect position. One bit is planned to identify the bright spot and the dark spot. Compared with a line buffer, the defect buffer 110 in the size ((N+1)×P+Q+1)×M is much smaller.

Flowcharts of the proposed technology are described in the following paragraphs.

Figure 7:
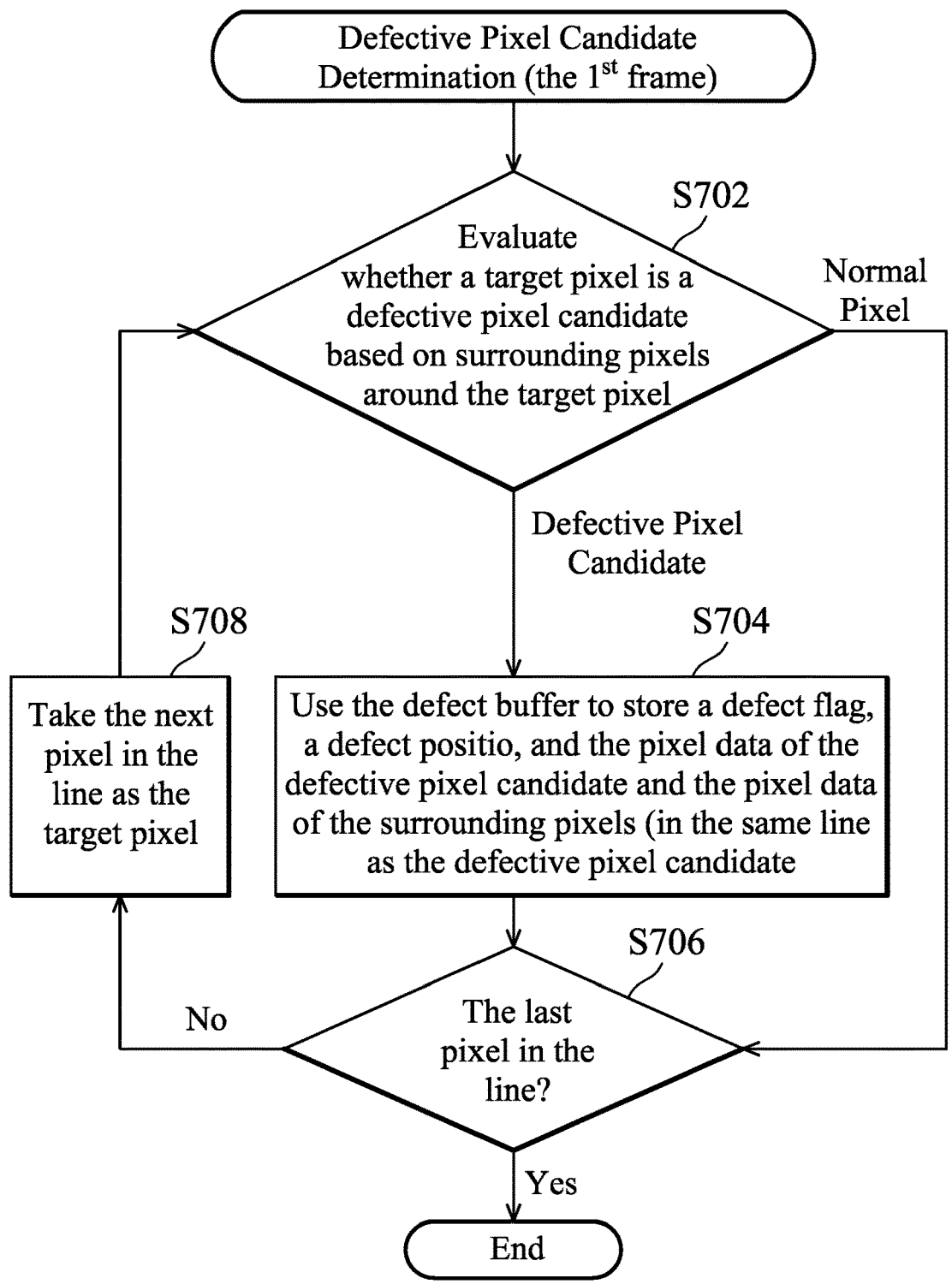
FIG. 7 depicts a flowchart related to the functional block 112, which identifies defective pixel candidates from one line of the first frame.

FIG. 7 depicts a flowchart related to the functional block 112, which identifies defective pixel candidates from one line of the first frame. In step S702, a target pixel is evaluated based on surrounding pixels around the target pixel. As shown in FIG. 2, the pixel G6 is evaluated based on the pixel data of the surrounding pixels G5 and G7 of the first frame. If it is determined that the target pixel is a defective pixel candidate, the procedure proceeds to step S704. In step S704, a defect flag (to identify the bright spot and the dark spot) and a defect position (position of G6) are buffered by the defect buffer 110, and the pixel data of the defective pixel candidate (G6) and the pixel data of the surrounding pixels (G5 and G7) in the same line as the defective pixel candidate (G6) are also buffered by the defect buffer 110 for the preliminary review later. Next, in step S706, it is determined whether the target pixel is the last pixel in the line. If yes, the evaluation of the pixels in the line is completed. If the evaluation of the line is not completed, the procedure proceeds to step S708 to take the next pixel in the line as the target pixel (for example, G7), and returns to step S702 to evaluate whether the new target pixel (G7) is a defective pixel candidate. When it is determined in step S702 that the target pixel is not defective (normal), the procedure skips step S704, and the determination of step S706 is performed without filling in the defect buffer 110.

Figure 8:
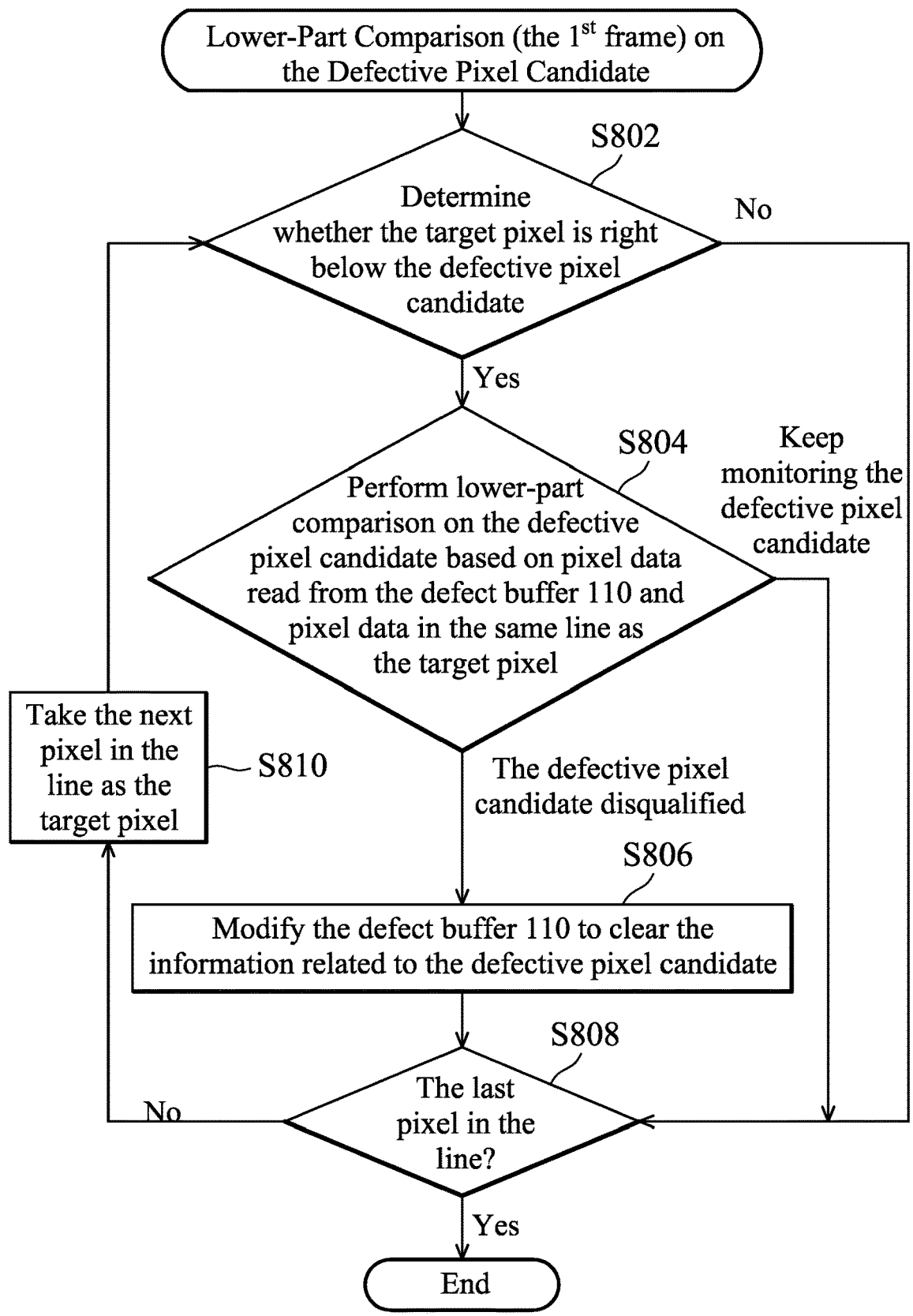
FIG. 8 depicts a flowchart related to the functional block 114, wherein lower-part comparisons are performed on defective pixel candidates in one line based on the first frame.

FIG. 8 depicts a flowchart related to the functional block 114, wherein lower-part comparisons are performed on defective pixel candidates in one line based on the first frame. In step S802, it is determined whether a target pixel is a pixel right below a defective pixel candidate. As shown in FIG. 3, according to the defect buffer 110 (recording a defective pixel candidate G6), the target pixel G11 is determined right below the defective pixel candidate (G6). If the target pixel is below a defective pixel candidate, step S804 is performed for the lower-part comparison of the defective pixel candidate (G6). Preliminary review on the defective pixel candidate (G6) is performed. In addition to the pixel data (G10, G11, G12) of the line being processed, the preliminary review may also require the pixel data (G5 and G7) in the line of the defective pixel candidate (G6), which can be obtained from the defect buffer 110. If the comparison result overturns the defective pixel candidate (G6), the procedure proceeds to step S806, and the defect buffer 110 is modified to clear the information related to the defective pixel candidate (G6). In step S808, it is determined whether the target pixel is the last pixel in the line. If yes, the procedure in FIG. 8 ends. Otherwise, the procedure proceeds to step S810 to take the next pixel in the line as the target pixel (e.g., G12), and returns to step S802 to check whether the new target pixel (G12) is right below pixel of a defective pixel candidate. In addition, if the determination made in step S802 is not true or step S804 primarily confirms the defective pixel candidate, the procedure proceeds to step S808 without changing the content of the defect buffer 110.

Figure 9:
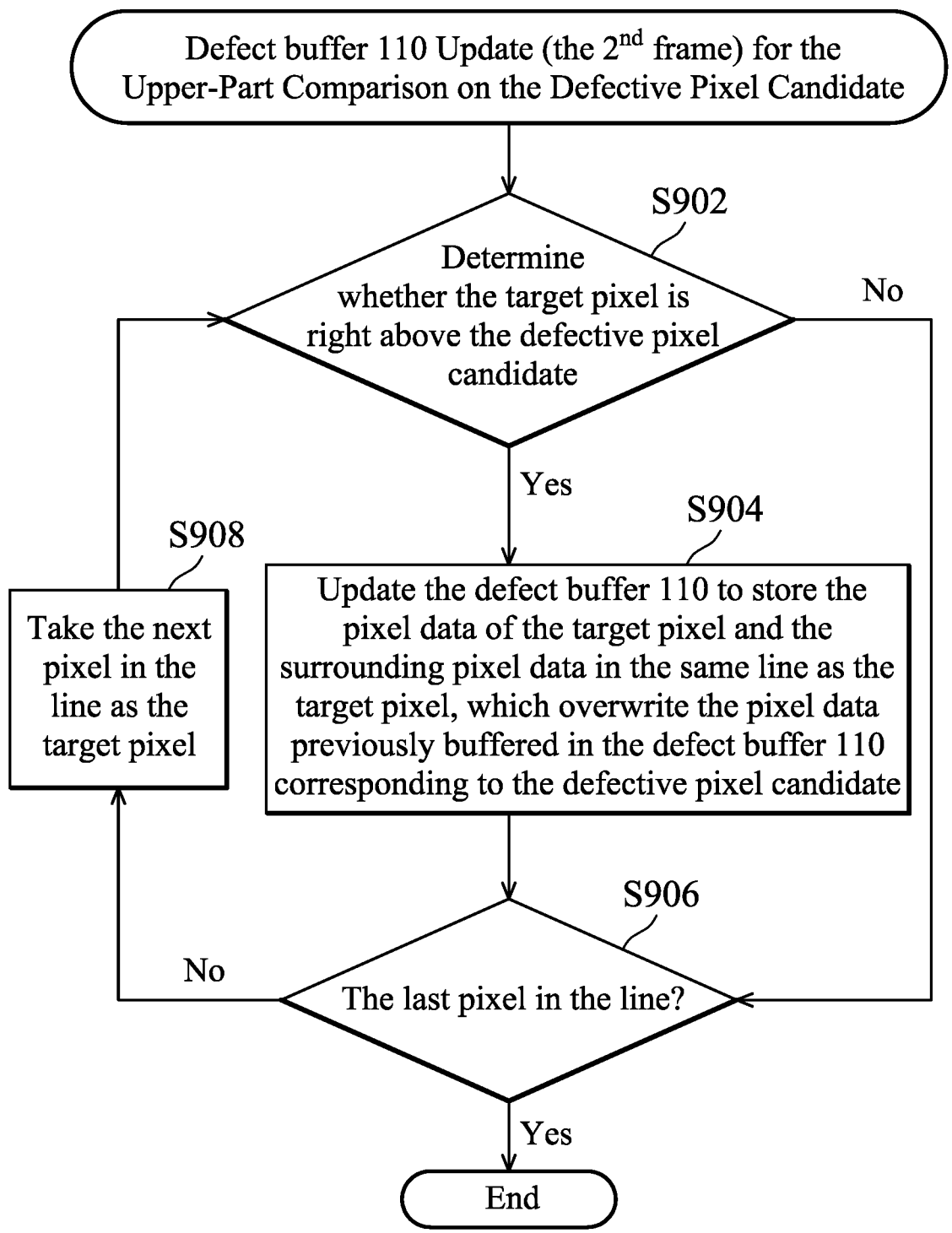
FIG. 9 is a flowchart related to the pre-work of the functional block 116, which updates the defect buffer 110 based on the pixel data in one line of the second frame.

FIG. 9 is a flowchart related to the pre-work of the functional block 116, which updates the defect buffer 110 based on the pixel data in one line of the second frame. In step S902, it is determined whether the target pixel is right above the defective pixel candidate. As shown in FIG. 4, according to the defect buffer 110 (recording information about the defective pixel candidate G6), it is known that the target pixel G1 is right above the defective pixel candidate G6. When the target pixel is the pixel right above the defective pixel candidate, the procedure proceeds to step S904. The pixel data (G1) and the surrounding pixel data (G0 and G2) in the same line as the upper pixel (G1) are buffered by the defect buffer 110, overwriting the pixel data (G5, G6 and G7 of the first frame) previously buffered in the defect buffer 110 corresponding to the defective pixel candidate (G6). In step S906, it is determined whether the last pixel of the line being processed has been checked by step S902. If yes, the procedure ends. Otherwise, the procedure proceeds to step S908 to take the next pixel in the line as the target pixel (e.g., G2), and returns to step S902 to check whether the new target pixel (G2) is right above any defective pixel candidate. If the determination made in step S902 is not established, the procedure proceeds to step S906 without modifying the content of the defect buffer 110.

Figure 10:
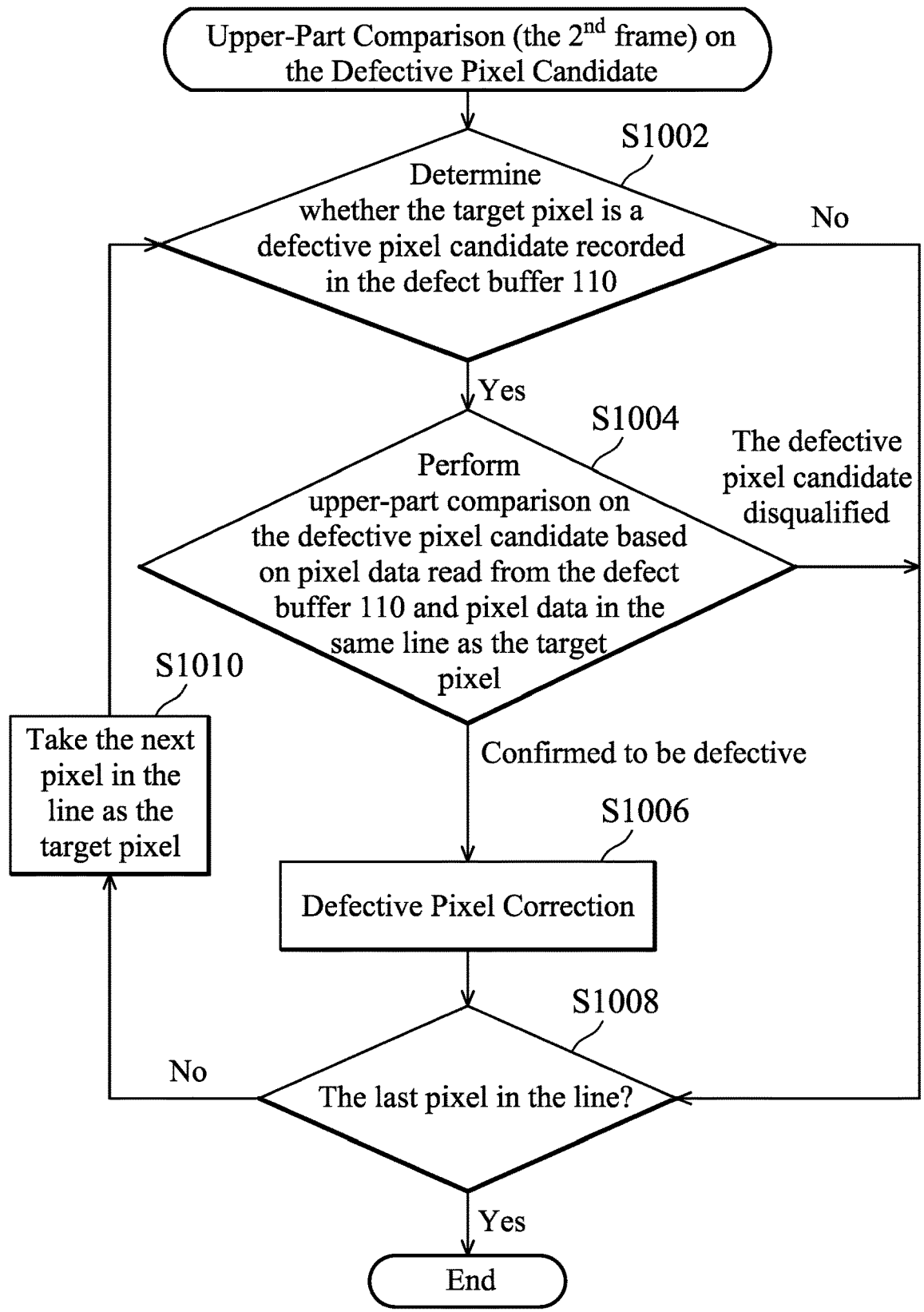
FIG. 10 is a flowchart related to the comparison function of the functional block 116, in which upper-part comparison of defective pixel candidates in a line is performed based on the second frame.

FIG. 10 is a flowchart related to the comparison function of the functional block 116, in which upper-part comparison of defective pixel candidates in a line is performed based on the second frame. In step S1002, it is determined whether the target pixel is a defective pixel candidate recorded in the defect buffer 110. As shown in FIG. 5, according to information stored in the defect buffer 110 (recording the defective pixel candidate G6), it is known that the target G6 is a defective pixel candidate. When the target pixel is a defective pixel candidate recorded in the defect buffer 110, the procedure proceeds to step S1004 to perform upper-part comparison on the defective pixel candidate (G6), which is regarded as final review of the defective pixel candidate. In addition to the pixel data (G5, G6 and G7) in the line being processed where the defective pixel candidate (G6) is located, the upper-part comparison of the defective pixel candidate (G6) may further require the pixel data (G0, G1, and G2) in the upper line. The pixel data (G0, G1, and G2) is read from the defect buffer 110. If the comparison result confirms that the defective pixel candidate (G6) is defective, the procedure proceeds to step S1006 to perform defective pixel correction. For example, the pixel data of the defective pixel G6 is corrected based on the pixel data of pixels G0, G1, and G2 read from the defect buffer 110 and the pixel data of pixels G5 and G7 of the line being processed. In step S1008, it is determined whether the last pixel of the line being processed has been checked by step S1002. If yes, the procedure ends. Otherwise, the procedure proceeds to step S1010 to take the next pixel in the line being processed as the target pixel (e.g., G7), and returns to step S1002 to check whether the new target pixel (G7) is a defective pixel candidate recorded in the defect buffer 110. In addition, if the determination made in step S1002 is not true or step S1004 determines that the defective pixel candidate is not really defective, the procedure proceeds to step S1008 without performing the defective pixel correction.

In an exemplary embodiment, defective pixels found out in the earlier frames can be corrected according to the flowchart of FIGS. 9 and 10 (referring to FIGS. 6A and 6B).

Since two frames are required to confirm the defective pixels, in an exemplary embodiment, the same exposure intervals and the same exposure compensation gains are applied to the two frames.

Figure 11:
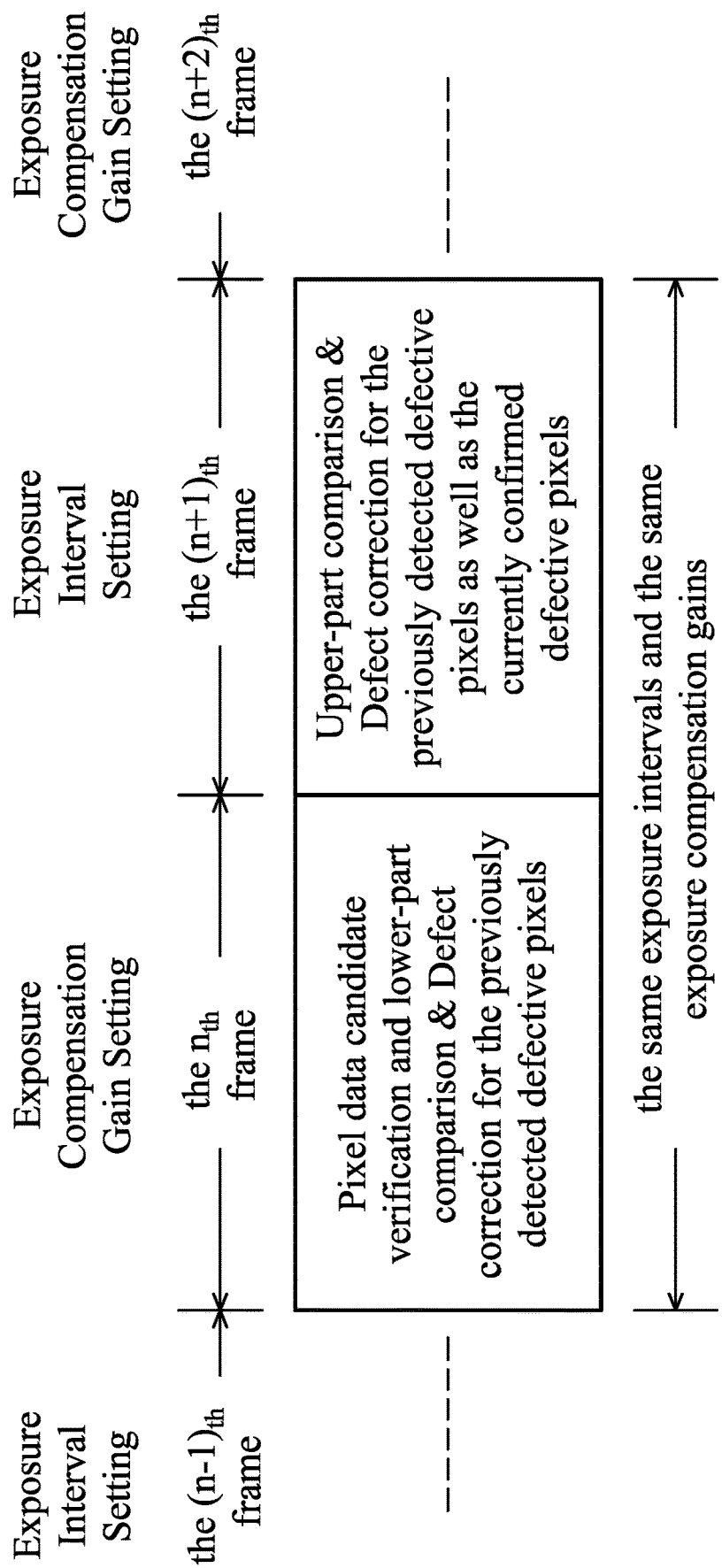
FIG. 11 is a timing diagram depicting the exposure interval setting and the exposure compensation gain setting of the image sensor 102.

FIG. 11 is a timing diagram. The image processor 106 sets the exposure interval in the $(n-1)_{th}$ frame and, accordingly, sets the exposure compensation gain in the $n_{th}$ frame. Again, the image processor 106 sets the exposure interval in the $(n+1)_{th}$ frame and, accordingly, sets the exposure compensation gain in the $(n+2)_{th}$ frame. Since the exposure compensation gain can be immediately reflected on the captured pixel data which is transferred to the defective pixel detection and correction circuit 104, the same exposure intervals and the same exposure compensation gains are applied to the $n_{th}$ frame and the $(n+2)_{th}$ frame, and this helps the detection of defective pixels which requires two consecutively captured frames. The $n_{th}$ frame shown in the figure may be the aforementioned first frame for defective pixel candidates identification and lower-part comparison. The $(n+1)_{th}$ frame may be the aforementioned second frame for upper-part comparison.

In an exemplary embodiment, the $n_{th}$ frame is corrected to compensate for the defective pixels found out in the $(n-1)_{th}$ frame, and more defective pixels may be found out and also corrected in the $(n+1)_{th}$ frame.

The aforementioned defective pixel detection and correction technology may be implemented in a variety of hardware architectures. The defective pixel detection and correction methods developed based on the forgoing concepts belong to the scope of the present invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image-sensing system, comprising:
    an arithmetic logic unit, determining a defective pixel candidate of an image sensor based on a first frame captured by the image sensor, performing lower-part comparison on the defective pixel candidate based on the first frame, and performing an upper-part comparison on the defective pixel candidate based on a second frame captured by the image sensor, wherein the defective pixel candidate is confirmed to be defective based on the first frame as well as the second frame; and
    a defect buffer, coupled to the arithmetic logic unit,
    wherein:
    corresponding to the defective pixel candidate, the arithmetic logic unit uses the defect buffer to store a first set of pixel data of the first frame to be accessed in the lower-part comparison;
    the first set of pixel data is captured by a portion of pixels in a line where the defective pixel candidate is located;
    the arithmetic logic unit further uses the defect buffer to store a second set of pixel data of the second frame to be accessed in the upper-part comparison; and
    the second set of pixel data is captured by a portion of pixels in an upper line of the defective pixel candidate.

2. The image-sensing system as claimed in claim 1, wherein the arithmetic logic unit uses the defect buffer to store:
    a defect flag, marking the defective pixel candidate as a bright spot or a dark spot;
    a defect position, recording a position of the defective pixel candidate; and
    the first set of pixel data, or the second set of pixel data that overwrites the first set of pixel data.

3. The image-sensing system as claimed in claim 1, wherein:
    when processing the first frame, the arithmetic logic unit checks a plurality of surrounding pixels which are in the same line as a target pixel and, accordingly, determines whether the target pixel is the defective pixel candidate;
    when the target pixel is determined to be the defective pixel candidate, the arithmetic logic unit uses the defect buffer to store pixel data of the target pixel and pixel data of the plurality of surrounding pixels as the first set of pixel data.

4. The image-sensing system as claimed in claim 1, wherein:
    the defect buffer further records a position of the defective pixel candidate;
    when processing the first frame, the arithmetic logic unit checks the defect buffer to determine whether a target pixel is right below the defective pixel candidate;
    when the target pixel is right below the defective pixel candidate, the arithmetic logic unit reads the defect buffer to get the first set of pixel data;
    based on the first set of pixel data read from the defect buffer and a third set of pixel data of the first frame, the arithmetic logic unit performs the lower-part comparison on the defective pixel candidate; and
    the third set of pixel data is captured by a portion of pixels in a line where the target pixel is located.

5. The image-sensing system as claimed in claim 1, wherein:
    the defect buffer further records a position of the defective pixel candidate;
    when processing the second frame, the arithmetic logic unit checks the defect buffer to determine whether a target pixel is right above the defective pixel candidate;
    when the target pixel is right above the defective pixel candidate, the arithmetic logic unit uses the defect buffer to store pixel data of a portion of pixels in a line where the target pixel is located as the second set of pixel data, and overwrites the first set of pixel data stored in the defect buffer by the second set of pixel data.

6. The image-sensing system as claimed in claim 1, wherein:
    the defect buffer further records a position of the defective pixel candidate;
    when processing the second frame, the arithmetic logic unit checks the defect buffer to determine whether a target pixel is the defective pixel candidate:
    when the target pixel is the defective pixel candidate, the arithmetic logic unit reads the defect buffer to get the second set of pixel data;
    based on the second set of pixel data read from the defect buffer and a fourth set of pixel data of the second frame, the arithmetic logic unit performs the upper-part comparison on the defective pixel candidate; and
    the fourth set of pixel data is captured by a portion of pixels in a line where the target pixel is located.

7. The image-sensing system as claimed in claim 6, wherein:
    the defect buffer further records a defect flag that marks the defective pixel candidate as a bright spot or a dark spot; and
    when the defective pixel candidate is confirmed to be defective by the upper-part comparison, the arithmetic logic unit compensates for the defective pixel candidate according to the defect flag based on the second set of pixel data read from the defect buffer and the fourth set of pixel data.

8. The image-sensing system as claimed in claim 1, wherein:

prior to the first frame, the defect buffer has stored information for a defective pixel;
the arithmetic logic unit checks the defect buffer to determine whether a processing procedure of the first frame proceeds to an upper pixel of the defective pixel;
when the processing procedure of the first frame proceeds to the upper pixel of the defective pixel, the arithmetic logic unit uses the defect buffer to store a fifth set of pixel data;
the fifth set of pixel data is captured by a portion of pixels in a line where the upper pixel is located;
when the processing procedure of the first frame proceeds to the defective pixel, the arithmetic logic unit reads the defect buffer to get the fifth set of pixel data;
based on the fifth set of pixel data read from the defect buffer and a sixth set of pixel data of the first frame, the arithmetic logic unit compensates for the defective pixel according to a defect flag of the defective pixel; and
the sixth set of pixel data is captured by a portion of pixels in a line where the defective pixel is located.

9. The image-sensing system as claimed in claim 1 further comprising:
a defective pixel detection and correction circuit, comprising the arithmetic logic unit and the defect buffer; and
an image processor, coupled to the defective pixel detection and correction circuit and the image sensor, wherein the image processor sets an exposure interval of the image sensor prior to setting an exposure compensation gain of the image sensor,
wherein as set by the image processor, the image sensor uses the same exposure intervals and the same exposure compensation gains to capture the first frame and the second frame.

10. The image-sensing system as claimed in claim 9, further comprising:
the image sensor, coupled to the defective pixel detection and correction circuit, and coupled to the image processor through the defective pixel detection and correction circuit.

11. A method for defective pixel detection and correction, comprising:
determining a defective pixel candidate of an image sensor based on a first frame captured by the image sensor,
performing lower-part comparison on the defective pixel candidate based on the first frame, and
performing upper-part comparison on the defective pixel candidate based on a second frame captured by the image sensor,
wherein:
the defective pixel candidate is confirmed to be defective based on the first frame as well as the second frame;
corresponding to the defective pixel candidate, a first set of pixel data of the first frame is stored in a defect buffer to be accessed in the lower-part comparison, and the first set of pixel data is captured by a portion of pixels in a line where the defective pixel candidate is located; and
a second set of pixel data of the second frame is stored in the defect buffer to be accessed in the upper-part comparison, and the second set of pixel data is captured by a portion of pixels in an upper line of the defective pixel candidate.

12. The method for defective pixel detection and correction as claimed in claim 11, wherein the defect buffer stores:
a defect flag, marking the defective pixel candidate as a bright spot or a dark spot;
a defect position, recording a position of the defective pixel candidate; and
the first set of pixel data, or the second set of pixel data that overwrites the first set of pixel data.

13. The method for defective pixel detection and correction as claimed in claim 11, further comprising:
when processing the first frame, checking a plurality of surrounding pixels which are in the same line as a target pixel and, accordingly, determining whether the target pixel is the defective pixel candidate,
wherein when the target pixel is determined to be a defective pixel candidate, the defect buffer stores pixel data of the target pixel and pixel data of the plurality of surrounding pixels as the first set of pixel data.

14. The method for defective pixel detection and correction as claimed in claim 11, wherein:
the defect buffer further records a position of the defective pixel candidate;
when the first frame is processed, the defect buffer is checked to determine whether a target pixel is right below the defective pixel candidate;
when the target pixel is right below the defective pixel candidate, the first set of pixel data is read from the defect buffer;
based on the first set of pixel data read from the defect buffer and a third set of pixel data of the first frame, the lower-part comparison is performed on the defective pixel candidate; and
the third set of pixel data is captured by a portion of pixels in a line where the target pixel is located.

15. The method for defective pixel detection and correction as claimed in claim 11, wherein:
the defect buffer further records a position of the defective pixel candidate;
when the second frame is processed, the defect buffer is checked to determine whether a target pixel is right above the defective pixel candidate;
when the target pixel is right above the defective pixel candidate, the defect buffer stores pixel data of a portion of pixels in a line where the target pixel is located as the second set of pixel data, and the second set of pixel data overwrites the first set of pixel data.

16. The method for defective pixel detection and correction as claimed in claim 11, wherein:
the defect buffer further records a position of the defective pixel candidate;
when the second frame is processed, the defect buffer is checked to determine whether a target pixel is the defective pixel candidate;
when the target pixel is the defective pixel candidate, the second set of pixel data is read from the defect buffer;
based on the second set of pixel data read from the defect buffer and a fourth set of pixel data of the second frame, the upper-part comparison is performed on the defective pixel candidate; and
the fourth set of pixel data is captured by a portion of pixels in a line where the target pixel is located.

17. The method for defective pixel detection and correction as claimed in claim 16, wherein:
the defect buffer further records a defect flag that marks the defective pixel candidate as a bright spot or a dark spot; and
when the defective pixel candidate is confirmed to be defective by the upper-part comparison, the defective pixel candidate is compensated for according to the defect flag based on the second set of pixel data read from the defect buffer and the fourth set of pixel data.

18. The method for defective pixel detection and correction as claimed in claim 11, wherein:
prior to the first frame, the defect buffer has stored information for a defective pixel;
the defect buffer is checked to determine whether a processing procedure of the first frame proceeds to an upper pixel of the defective pixel;
when the processing procedure of the first frame proceeds to the upper pixel of the defective pixel, the defect buffer stores a fifth set of pixel data;
the fifth set of pixel data is captured by a portion of pixels in a line where the upper pixel is located;
when the processing procedure of the first frame proceeds to the defective pixel, the fifth set of pixel data is read from the defect buffer;
based on the fifth set of pixel data read from the defect buffer and a sixth set of pixel data of the first frame, the defective pixel is compensated for according to a defect flag of the defective pixel; and
the sixth set of pixel data is captured by a portion of pixels in a line where the defective pixel is located.

19. The method for defective pixel detection and correction as claimed in claim 11, further comprising:
driving the image sensor to use the same exposure intervals and the same exposure compensation gains to capture the first frame and the second frame.

* * * * *